United States Patent [19]
Bennett et al.

[11] Patent Number: 4,864,615
[45] Date of Patent: Sep. 5, 1989

[54] REPRODUCTION OF SECURE KEYS BY USING DISTRIBUTED KEY GENERATION DATA

[75] Inventors: Christopher J. Bennett; Michael V. Harding, both of San Diego; Paul Moroney, Cardiff-by-the-Sea, all of Calif.

[73] Assignee: General Instrument Corporation, New York, N.Y.

[21] Appl. No.: 200,111

[22] Filed: May 27, 1988

[51] Int. Cl.$^4$ ............................................... H04L 9/02
[52] U.S. Cl. ........................................ 380/21; 380/20; 380/47
[58] Field of Search .................... 380/20, 21, 45, 47

[56] References Cited

U.S. PATENT DOCUMENTS

| | | | |
|---|---|---|---|
| 4,613,901 | 9/1986 | Gilhousen et al. | 380/20 |
| 4,634,808 | 1/1987 | Moerder | 380/20 |
| 4,694,491 | 9/1987 | Horne et al. | 380/20 |
| 4,712,238 | 12/1987 | Gilhousen et al. | 380/20 |
| 4,736,422 | 4/1988 | Mason | 380/20 |
| 4,792,973 | 12/1988 | Gilhousen et al. | 380/20 |

OTHER PUBLICATIONS

Denning, "Cryptography and Data Security" Addison Wesley, 1982, pp. 14–16, 161–164, 169–171.
"Specification for Conditional Access Receivers", Draft NR-MSK Specification Vedlegg 4, Oct. 1987, pp. 40–44.

*Primary Examiner*—Salvatore Cangialosi
*Attorney, Agent, or Firm*—Edward W. Callan

[57] ABSTRACT

A key security system provides for the reproduction of secure keys by using distributed key generation data and a distributed encrypted prekey. The system encrypts program key generation data with a program key prekey in accordance with a first encryption algorithm to produce the program key; processes the program key to produce a keystream; and processes an information signal with the keystream to produce a scrambled information signal. The program key prekey is encrypted with a category key in accordance with a second encryption algorithm to produce an encrypted program key prekey. The scrambled information signal, the program key generation data and the encrypted program key prekey are distributed to descramblers. The descrambler within the key security system decrypts the distributed encrypted program key prekey with the category key in accordance with the second encryption algorithm to reproduce the program key prekey; encrypts the distributed program key generation data with the reproduced program key prekey in accordance with the first encryption algorithm to produce the program key; processes the reproduced program key to reproduce the keystream; and processes the distributed scrambled information signal with the reproduced keystream to descramble the distributed scrambled information signal. The key generation data incudes authorization data that must be processed by the authorization processor in the descrambler in order to enable the descrambler. The use of authorization data as key generation data protects the authorization data from spoofing attacks. When more data must be protected than a single operation of the encryption algorithm can support, then additional data blocks are protected by chaining the system, wherein the output from one stage forms part of the input to the next. The key generation data for the program key includes a sequence number securely associated with the category key to thereby "timelock" program key reproduction to the use of a current category key and thus prevent an attack based upon the use of an obsolete category key.

24 Claims, 9 Drawing Sheets

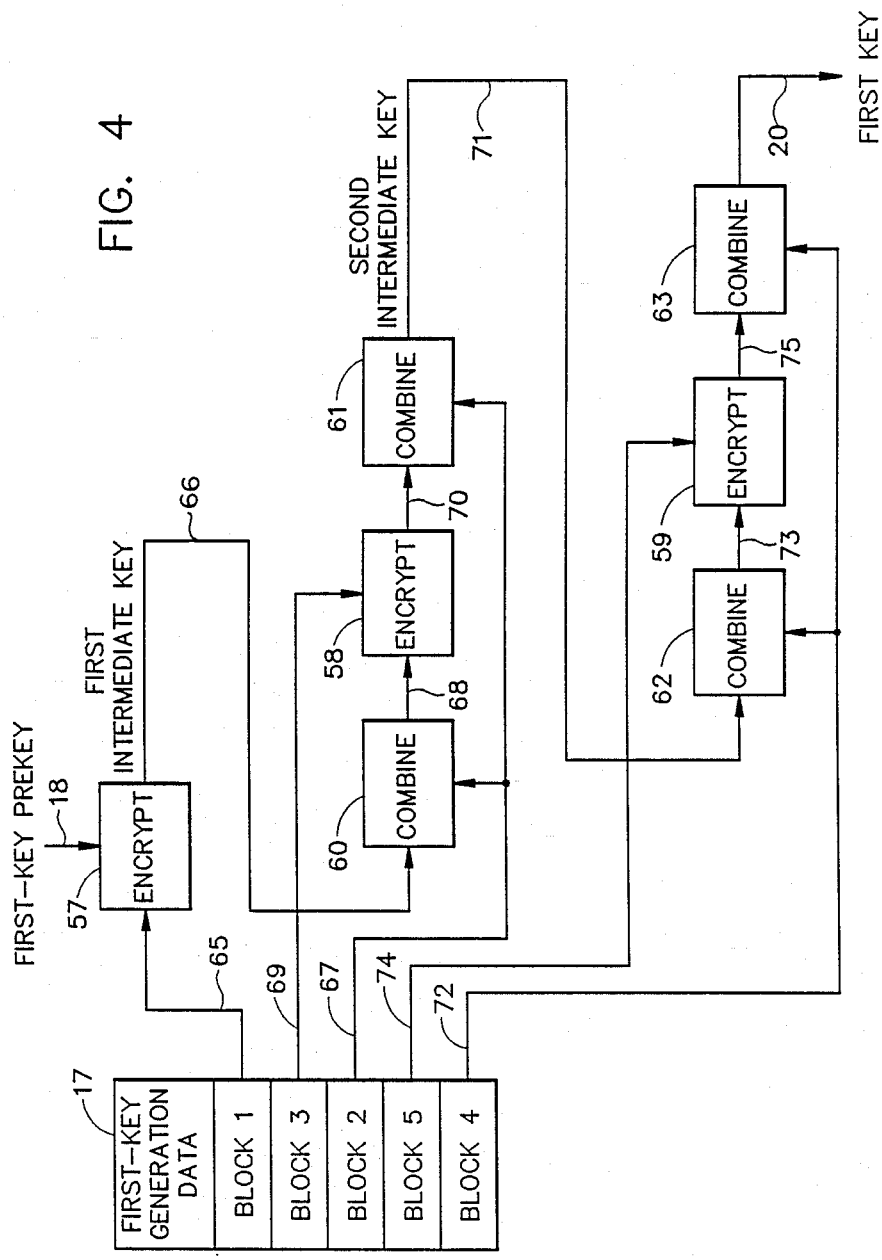

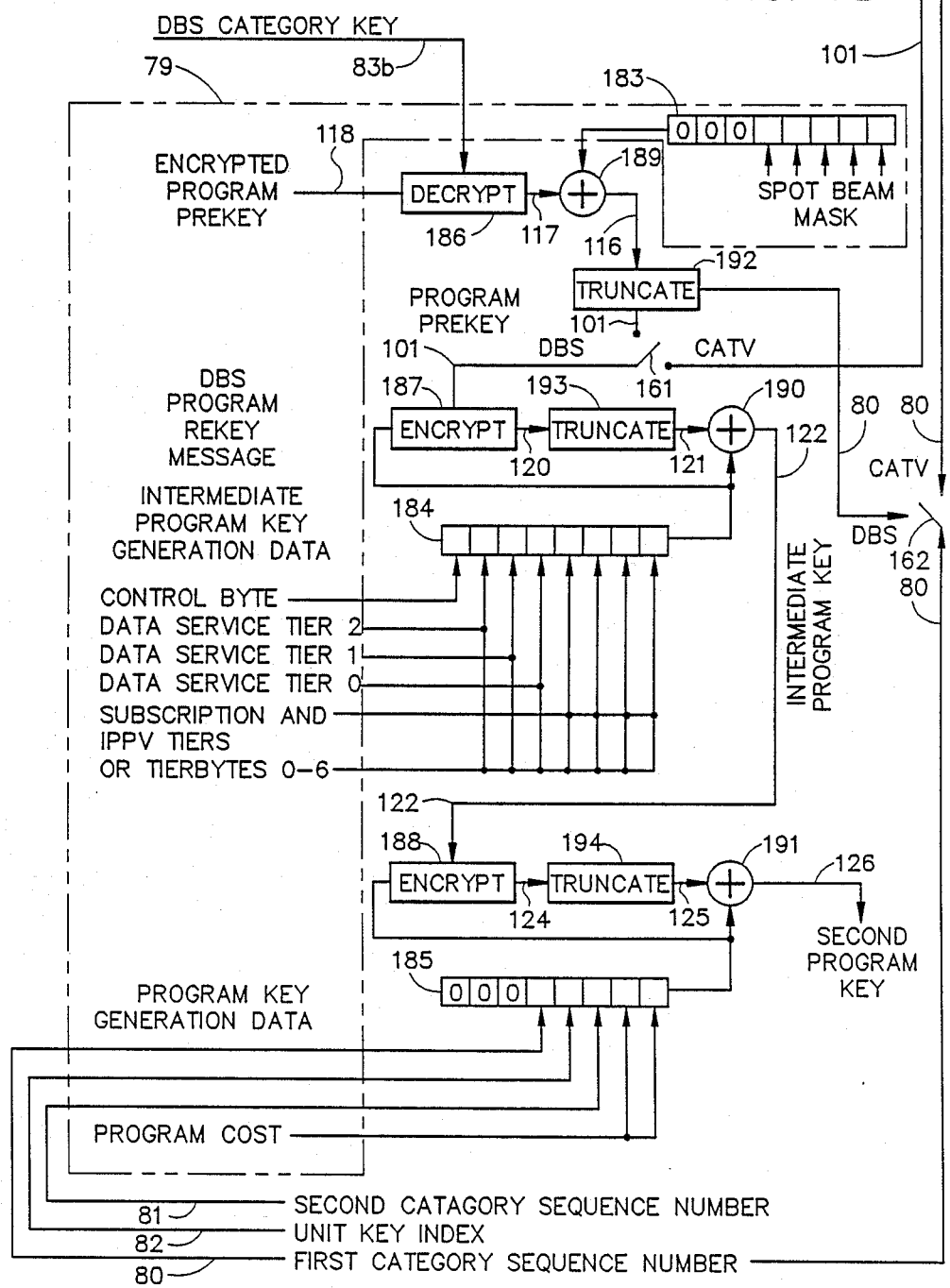

REPRODUCTION OF SECURE KEYS BY USING DISTRIBUTED KEY GENERATION DATA

BACKGROUND OF THE INVENTION

The invention pertains to descrambling and decryption systems used in communications networks in which individual descramblers may be selectively authorized for access to the services provided by the network.

All such systems require the secure delivery of authorization data to the descrambler. Security of the signal carrying the services is obtained by a technique of ensuring that any tampering of the messages delivering the authorization data causes a violation of the authorization conditions required by the descrambler for providing successful access to the network. Examples of such technique are described below.

A classical "signature verification" technique, which is described by D. E. R. Denning "Cryptography and Data Security", Addison-Wesley, 1983, as applied to this type of communications system, requires the authorization message delivered to the descrambler to contain a data block which contains a known value of sufficient size encrypted under a key shared between the descrambler and the originator of the message. If the descrambler obtains the known value after decryption, then it accepts the message as describing the legitimate conditions for authorization.

A "data comparison" technique described in "Specification for Conditional Access Receivers", Draft NR-MSK Specification Vedlegg 4, Oct. 1987), requires an unknown value of a sufficiently large number of bits to be repeated twice in the encrypted portion of the authorization message. If the descrambler finds, after decryption, that the two blocks match then it accepts the message as describing the legitimate conditions for authorization.

A "selective delivery" technique described in U.S. Pat. No. 4,613,901 to Klein S. Gilhousen, Charles F. Newby, Jr. and Karl E. Moerder, utilizes a hierarchy of secret keys to provide access control. Each level of the hierarchy is associated with an address. If the descrambler does not possess one of the appropriate addresses, it does not receive the message destined for the address containing the secret key for that level of the hierarchy. Since the secret key at each level of the hierarchy is encrypted under the secret key of the next level, an attacker cannot substitute a message intended for a different address.

A "key modification" technique described in U.S. Pat. No. 4,712,238 to Klein S. Gilhousen, Jerrold A. Heller, Michael V. Harding and Robert D. Blakeney, is similar to the "selective delivery" technique, but delivers authorization data along with the secret keys. The authorization data is in the clear, but is used to alter the secret keys in such a way that any attempt to modify the clear data causes incorrect generation of the secret keys when the descrambler performs the decryption operation. Since the descrambler then possess the incorrect keys, it will not correctly decrypt the signal.

All these systems protect the authorization data against tampering based on modification to the authorization messages, where such modification is based solely on knowledge of the contents of the message and on the operation of the system. However, if an attacker is able to gain additional information about the keys in use by the descrambler, e.g. through theft of key lists, then the services are open to attacks known as "spoofing". In these attacks, the attacker intercepts the authorization message, decrypts certain portions of it, substitutes data desired by the attacker, and reencrypts the substituted message under the key known to be held by the descrambler. The resultant message is delivered to the descrambler, causing the descrambler to authorize incorrectly.

An object of the present invention is to render such attacks null and void, either immediately, or upon replacement of the compromised keys by the message originator. As a result of this, an attacker is forced either to compromise the descrambler hardware or to obtain the most basic keys, which cannot be changed because they are fixed inside the descrambler hardware.

SUMMARY OF THE INVENTION

The present invention provides a key security system and a descrambler for reproducing secure keys by using distributed key generation data and a distributed encrypted prekey.

The key security system of the present invention includes means for encrypting first-key generation data with a first-key prekey in accordance with a first encryption algorithm to produce a first key; means for processing the firs key to produce a keystream; means for processing an information signal with the keystream to produce a scrambled information signal; means for encrypting the first-key prekey with a second key in accordance with a second encryption algorithm to produce an encrypted first-key prekey; means for distributing the scrambled information signal, the first-key generation data and the encrypted first-key prekey; and a descrambler, including means for providing the second key; means for decrypting the distributed encrypted first-key prekey with the second key in accordance with the second encryption algorithm to reproduce the first-key prekey; means for encrypting the distributed first-key generation data with the reproduced first-key prekey in accordance with the first encryption algorithm to reproduce the first key; means for processing the reproduced first key to reproduce the keystream; and means for processing the distributed scrambled information signal with the reproduced keystream to descramble the distributed scrambled information signal.

The present invention may be used to prevent, or guarantee termination of, such spoofing techniques as (1) substitution of pirate access specifications for the intended access specifications in the case when all access authorization must be possessed by the descrambler; (2) substitution of pirate access specification for the intended access specifications in the case when only part of the access authorization must be possessed by the descrambler; and (3) interception of a deauthorization message, thus causing the descrambler to remain authorized through the use of obsolete keys and/or authorization data.

The key generation data may include certain quantities related to the authorization process, and may be transmitted in the clear. These key generation data quantities may be transmitted in the same message as the prekey and/or may already be stored in the descrambler.

The contents of the key generation data and the prekey may be any data values that can be shared by all descramblers requiring the reproduced key. An example of such data, used in the preferred embodiment, is the set of access tiers associated with a program in a subscription pay-TV system.

In the preferred embodiment, the messages carrying encrypted prekey and the key generation data are transmitted in the signal carrying the services of a subscription pay-TV system, but they may also be transmitted separately.

Once the descrambler has reproduced the prekey by decrypting the encrypted prekey it uses the reproduced prekey to process the key generation data to reproduce the key. Since the key reproduction is performed inside the descrambler, any attacker wishing to alter the key generation data to a desired value must also alter the prekey to obtain the same output data. Such an attack would also require breaking the encryption algorithm.

If the descrambler can be authorized by correctly setting only a small number of bits of the key generation data, then an attacker may be able to find a suitable pair of prekey and key generation data within a short time. To thwart such an attack the encryption process in producing the key is enhanced. In accordance with such enhanced encryption process, the key generation data is encrypted by the first key in accordance with the encryption algorithm to produce encrypted key generation data; and the encrypted key generation data is processed with the key generation data to produce the first key. In the face of such enhancement, an attacker would have to break the encryption algorithm regardless of the use of the key generation data or the prekey by the descrambler. This enhanced encryption process is used in the preferred embodiment.

If the prekey is delivered encrypted under a key provided in the descrambler, and the key generation data for the key derived from the prekey includes a sequence number securely associated with the stored key, then the descrambler can be configured so that it will not decrypt the prekey and generate the required key unless it possesses the correct key identified by the sequence number. This technique, referred to as "timelock", ensures that the descrambler always requires up-to-date keys, and prevents attacks based on the use of obsolete keys.

By repeated application of the basic techniques of the present invention, a chain of protection may be created whereby arbitrarily large blocks of authorization data are protected against spoofing attacks.

Such chains can be specified in such a way that a group of descramblers which does not require all the data in the chain can enter the chain at the earliest point which protects data applicable to that group of descramblers.

Also, if more data must be protected than a single operation of the encryption algorithm can support, then additional data blocks are protected by chaining the system, wherein the output from one stage forms part of the input to the next. In the first stage of the chain, the key generation number must be processed with a prekey. Subsequent stages may take several forms, such as described in the description of the preferred embodiments.

Chaining is also appropriate when two or more groups of descramblers must use the same key, but do not process the same key generation data. Each group of descramblers can be provided one encrypted prekey in a common message, and derive the data and keys used in the subsequent stages from key generation data acquired from messages referring to the later stages of the key reproduction process. The messages thus form a key generation chain. The entry point to the chain for each descrambler must be identified by a securely protected quantity.

A two-stage chain is used in program key generation in the preferred embodiment. Each block of key generation data represents the set of access tiers required for a given category (group) of descramblers; and the key generation chain is completed with a stage that uses sensitive program attributes as key generation data.

Another feature of the key security system of the present invention is that it may be used in a scrambled signal communication system that is compatible with certain existing digital descrambling systems, such as the system described in U.S. Pat. No. 4,712,238. In existing networks in which existing descramblers use a predetermined key hierarchy, such as that described in U.S. Pat. No. 4,712,238, it is possible to introduce a new family of descramblers into the network in a compatible fashion by sharing a program key generated by the final stage of the lowest level of the new key hierarchy which is different from the existing system. This can be done provided that the two systems share the same access control and keystream generation procedures below the point of linkage, and that the program key so generated by the new system (1) is valid for the same set of services in both systems; (2) is valid for the same period of time in both systems; and (3) has the same number of bits in both systems. Also it must be possible to deliver the program key produced in accordance with the present invention directly via a message in the presently existing system, preferably in an encrypted form.

Additional features of the present invention are described with reference to the description of the preferred embodiments.

BRIEF DESCRIPTION OF THE DRAWING

FIG. 4 illustrates another alternative technique according to the present invention of using several blocks of descrambler authorization data as key generation data and thereby protecting such authorization data from such alteration as would enable unauthorized use of the descrambler.

DESCRIPTION OF THE PREFERRED EMBODIMENTS

Figure 1A:
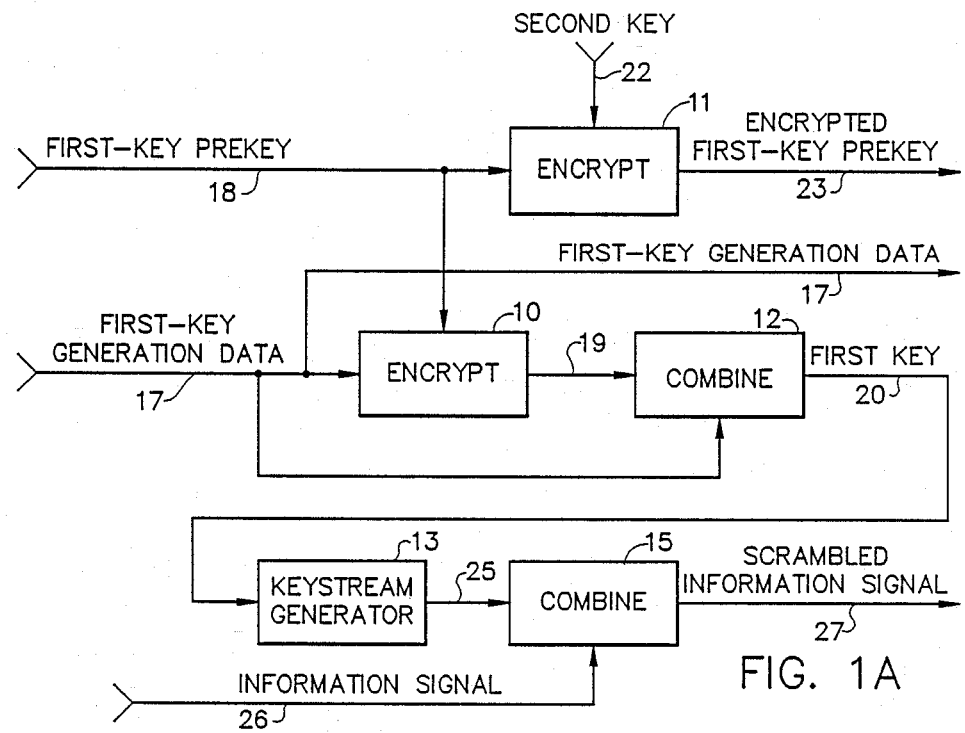
FIG. 1A is a block diagram of a preferred embodiment of the scrambling and key generation data and prekey processing portions of the key security system of the present invention.

Referring to FIG. 1A, a preferred embodiment of the scrambling and key generation data and prekey processing portions of the key security system of the present invention includes a first encryption unit 10, a second encryption unit 11, a first signal combining unit 12, a keystream generator 13 and a second signal combining unit 15. The encryption units 10, 11 encrypt data in accordance with a predetermined encryption algorithm, such as the Data Encryption Standard (DES) algorithm. Other encryption algorithms also may be used. The encryption algorithm must be such that it is computationally infeasible to perform decryption without prior knowledge of the encryption key. The DES algorithm is an example of such an encryption algorithm. Both encryption units 10, 11 may be implemented in a single unit on a time-shared basis. The combining units 12, 15 process received signals in accordance with a predetermined processing scheme. In the preferred embodiment, the combining units 12, 15 are exclusive-OR (XOR) logic elements.

The first encryption unit 10 encrypts first-key generation data 17 with a first-key prekey 18 in accordance with a first encryption algorithm to produce encrypted first-key generation data 19. The combining unit 12 processes the first-key generation data 17 with the encrypted first-key generation data 19 to produce a first key 20.

The second encryption unit 11 encrypts the first-key prekey 18 with a second key 22 in accordance with a second encryption algorithm to produce an encrypted first-key prekey 23. The second encryption algorithm may be identical to the first encryption algorithm, or different algorithms may be used.

The keystream generator 13 processes the first key 20 to produce a keystream 25; and the combining unit 15 processes an information signal 26 with the keystream 25 to produce a scrambled information signal 27.

Figure 1B:
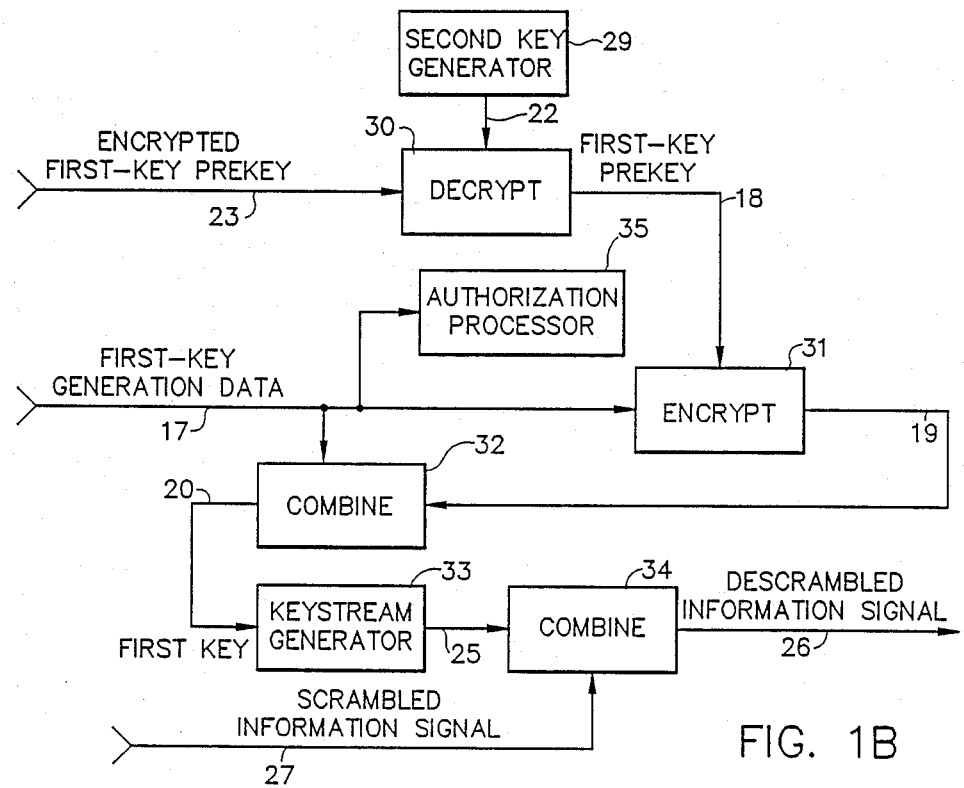
FIG. 1B is a block diagram of a preferred embodiment of a descrambler used with the scrambling and key generation data and prekey processing portions of the key security system according to the present invention shown in FIG. 1A.

The scrambled information signal 27, the first-key generation data 17 and the encrypted first-key prekey 23 are distributed to descramblers, such as the descrambler shown in FIG. 1B.

Referring to FIG. 1B a preferred embodiment of a descrambler according to the present invention includes a second key generator 29, a first decryption unit 30, a third encryption unit 31, a third combining unit 32, a second keystream generator 33, a fourth combining unit 34 and an authorization processor 35. As in that portion of the key security system shown in FIG. 1A, the combining units 32, 34 process received signals in accordance with a predetermined processing scheme; and in the preferred embodiment, the combining units 32, 34 are XOR logic elements. Also, the decryption and encryption units 30, 31 respectively decrypt and encrypt data in accordance with a predetermined encryption algorithm, such as the DES algorithm. Other encryption algorithms also may be used; and both encryption units 30, 31 may be implemented in a single unit on a time-shared basis.

The second key generator 29 generates the second key 22. In an alternative embodiment, the second key is stored in the descrambler instead of being generated in the descrambler. The first decryption unit 30 decrypts the distributed encrypted first-key prekey 23 with the second key 22 in accordance with the second encryption algorithm to reproduce the first-key prekey 18.

The third encryption unit 31 encrypts the distributed first-key generation data 17 with the reproduced first-key prekey 18 in accordance with the first encryption algorithm to reproduce the encrypted first-key generation data 19. The combining unit 32 processes the reproduced encrypted first-key generation data 19 with the distributed first-key generation data 17 to reproduce the first key 20.

The keystream generator 33 processes the reproduced first key 20 to reproduce the keystream 25; and the combining unit 34 processes the distributed scrambled information signal 27 with the reproduced keystream 25 to descramble the distributed scrambled information signal 27.

The authorization processor processes the distributed key generation data 17 in order to enable the descrambler. Such authorization processing is of the nature described in U.S. Pat. No. 4,712,238, wherein authorization signals such as cost and credit signals and a program mask and authorization word are processed to enable a descrambler. By using such authorization signals as first-key generation data, the authorization signals are protected against alteration, since if they are altered the first-key generation data distributed to the descrambler is likewise altered, whereby the descrambler will not be able to reproduce the first key by using altered key generation data.

In some embodiments of the key security system of the present invention, the quantity of first-key generation data that must be processed by the authorization processor in the descrambler in order to enable the descrambler exceeds the encryption capacity of a single operation of the applicable encryption algorithm. In such a key security system, the key generation data is divided into data blocks and the first key is generated by a more complex series of encryption steps in order to protect all of the blocks of data. Examples of systems for performing such more complex processing are described with reference to FIGS. 2 through 4.

Figure 2:
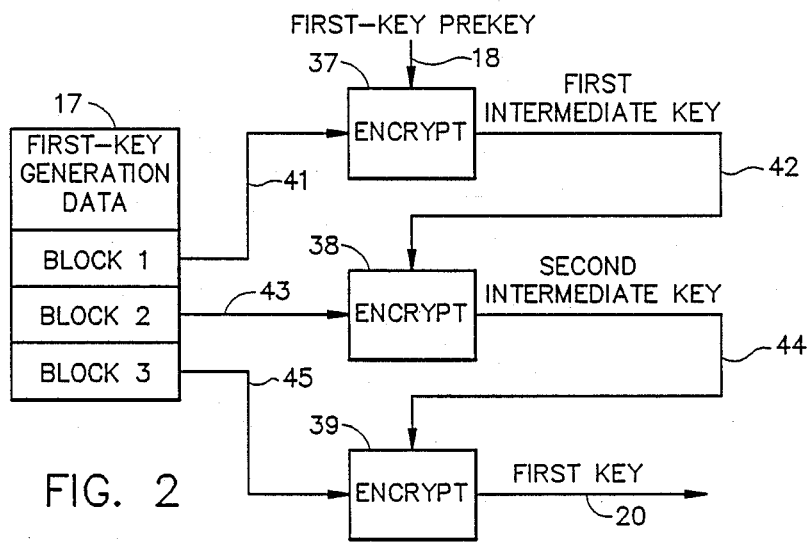
FIG. 2 illustrates one technique according to the present invention of using several blocks of descrambler authorization data as key generation data and thereby protecting such authorization data from such alteration as would enable unauthorized use of the descrambler.

Referring to FIG. 2, a system for producing the first key in both the descrambler of FIG. 1B and that portion of the key security system shown in FIG. 1A includes a first encryption unit 37, a second encryption unit 38 and a third encryption unit 39. Each of the encryption units 37, 38, 39 respectively encrypts data in accordance with a predetermined encryption algorithm, such as the DES algorithm. Other encryption algorithms also may be used; and all three encryption units 37, 38, 39 may be implemented in a single unit on a time-shared basis.

The first encryption unit 37 encrypts a first block 41 of the first-key generation data 17 with the first-key prekey 18 in accordance with a first encryption algorithm to produce a first intermediate key 42.

The second encryption unit 38 encrypts a second block 43 of the first-key generation data 17 with the first intermediate key 42 in accordance with a second encryption algorithm to produce a second intermediate key 44.

The third encryption unit 39 encrypts a third block 45 of the first-key generation data with the second intermediate key 44 in accordance with a third encryption algorithm to produce the first key 20.

The first, second and third encryption algorithms may be identical or different.

The number of encryption units included in the system of FIG. 2 is dependent upon the number of data blocks that are to be protected.

Each encryption unit 37, 38, 39 in the system of FIG. 2 preferably further includes the combining units shown in FIGS. 1A and 1B, wherein each block of key generation data is encrypted to produce an encrypted data block and also combined with the encrypted data block to produce the resultant key.

Figure 3:
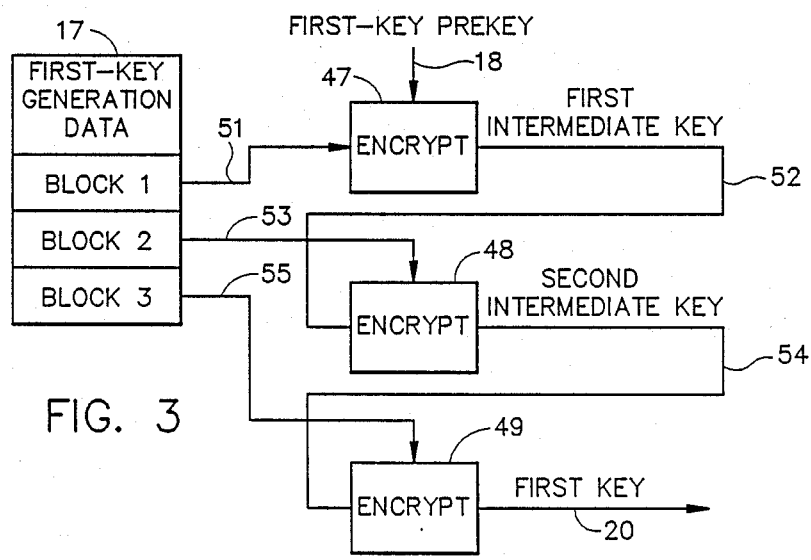
FIG. 3 illustrates an alternative technique according to the present invention of using several blocks of descrambler authorization data as key generation data and thereby protecting such authorization data from such alteration as would enable unauthorized use of the descrambler.

Referring to FIG. 3, another system for producing the first key in both the descrambler of FIG. 1B and that portion of the key security system shown in FIG. 1A includes a first encryption unit 47, a second encryption unit 48 and a third encryption unit 49. Each of the encryption units 47, 48, 49 respectively encrypts data in accordance with a predetermined encryption algorithm, such as the DES algorithm. Other encryption algorithms also may be used; and all three encryption units 47, 48, 49 may be implanted in a single unit on a time-shared basis.

The first encryption unit 47 encrypts a first block 51 of the first-key generation data 17 with the first-key prekey 18 in accordance with the first encryption algorithm to produce a first intermediate key 52.

The second encryption unit 48 encrypts the first intermediate key 52 with a second block 53 of the first-key generation data 17 in accordance with a second encryption algorithm to produce a second intermediate key 54.

The third encryption unit 49 encrypts the second intermediate key 54 with a third block 55 of the first-key generation data 17 in accordance with a third encryption algorithm to produce a first key 20.

The first, second and third encryption algorithms may be identical or different.

The number of encryption units included in the system of FIG. 3 is dependent upon the number of data blocks that are to be protected.

Each encryption unit 47, 48, 49 in the system of FIG. 3 preferably further includes the combining units shown in FIGS. 1A and 1B, wherein each block of key generation data is encrypted to produce an encrypted data block and also combined with the encrypted data block to produce the resultant key.

Referring to FIG. 4, still another system for producing the first key in both the descrambler of FIG. 1B and that portion of the key security system shown in FIG. 1A includes a first encryption unit 57, a second encryption unit 58, a third encryption unit 59, a first combining unit 60, a second combining unit 61, a third combining unit 62 and a fourth combining unit 63. Each of the encryption units 57, 58, 59 respectively encrypts data in accordance with a predetermined encryption algorithm, such as the DES algorithm. Other encryption algorithms also may be used; and all three encryption units 57, 58, 59 may be implemented in a single unit on a time-shared basis. The combining units 60, 61, 62, 63 preferably are XOR logic elements. Alternatively, other types of combining units may be used.

The first encryption unit 57 encrypting a first block 65 of the first-key generation data 17 with the first-key prekey 18 in accordance with the first encryption algorithm to produce a first intermediate key 66.

The first combining unit 60 processes a second block 67 of the first-key generation data 17 with the first intermediate key 66 to produce a preencrypted second block of data 68.

The second encryption unit 58 encrypts the preencrypted second block of data 68 with a third block 69 of the first-key generation data 17 in accordance with a second encryption algorithm to produce an encrypted second block of data 70.

The second combining unit 61 processess the encrypted second block of data 70 with the second block of data 67 to produce a second intermediate key 71.

The third combining unit 62 processes a fourth block 72 of the first-key generation data 17 with the second intermediate key 71 to produce a preencrypted fourth block of data 73.

The third encryption unit 59 encrypts the preencrypted fourth block of data 73 with a fifth block 74 of the first-key generation data 17 in accordance with a fourth encryption algorithm to produce an encrypted fourth block of data 75.

The fourth combining unit 63 processes the encrypted fourth block of data 75 with the fourth block of data 72 to produce the first key 20.

The first encryption unit 57 in the system of FIG. 4 preferably further includes the combining units shown in FIGS. 1A and 1B, wherein each block of key generation data is encrypted to produce an encrypted data block and also combined with the encrypted data block to produce the resultant key.

The first, second and third encryption algorithms may be identical or different.

The number of encryption and combining units included in the system of FIG. 4 is dependent upon the number of data blocks that are to be protected.

FIGS. 5 through 8 show a preferred embodiment of the security system of the present invention incorporated within a pay television system, such as described in U.S. Pat. No. 4,712,238.

The key hierarchy of the system generally follows that described in U.S. Pat. No. 4,613,901. However, in this embodiment, as described with reference in FIGS. 5 and 7, encrypted program prekeys and encrypted program prekey prekeys are distributed to the descramblers instead of encrypted program keys. In such patent the program keys are referred to as "channel" keys.

The output of this chain may be further modified if an impulse-purchasable program has a free preview portion. In this case, one bit of the output of the program key generation chain is complemented during the free preview portion of the program.

Figure 5A:
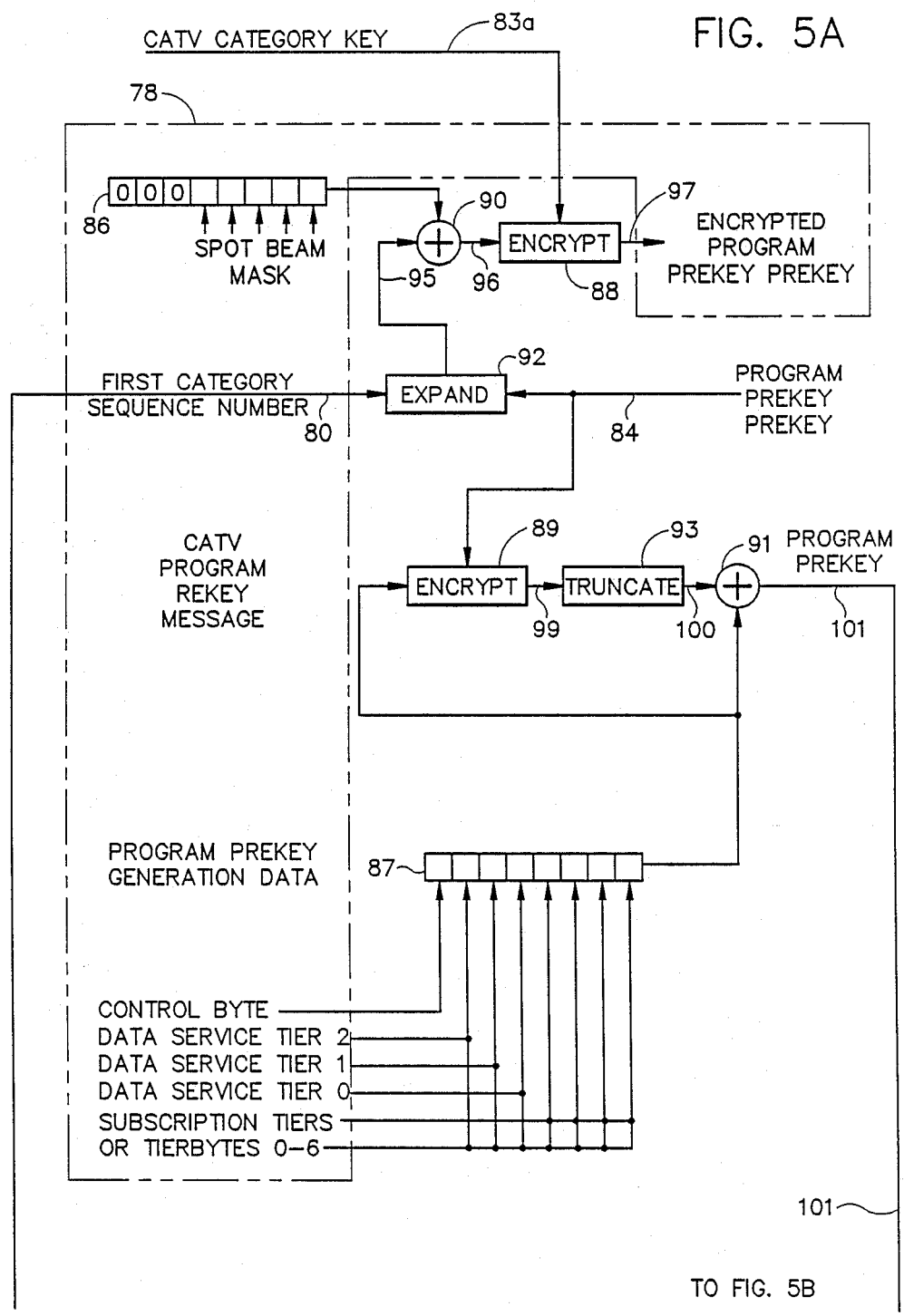
FIG. 5, which is a combination of FIGS. 5A and 5B, is a block diagram of a preferred embodiment of a portion of a key security system according to the present invention that processes key generation data and a prekey for distribution to descramblers.
Figure 5B:
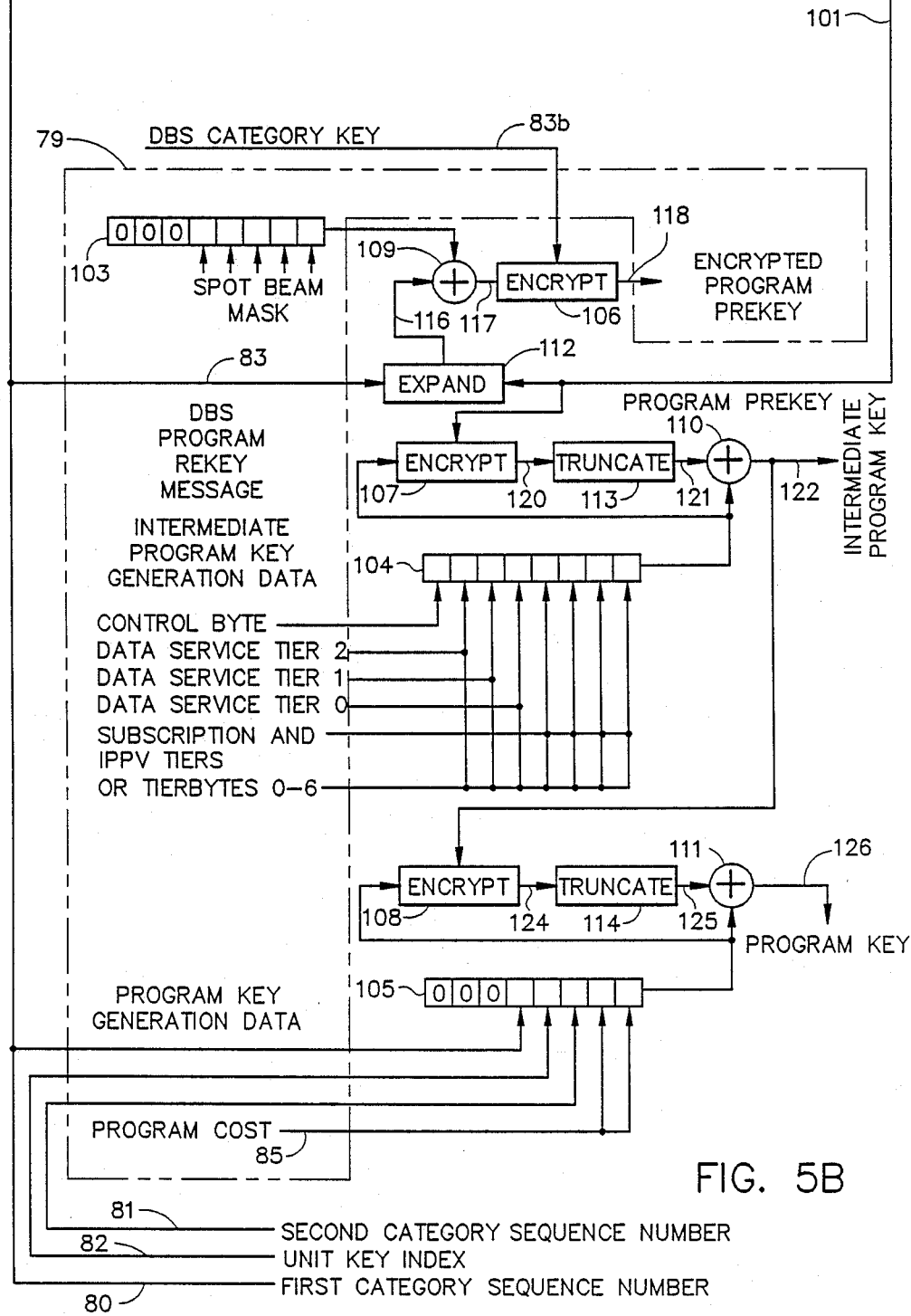

Referring to FIG. 5, the security system includes a CATV section for processing key generation data pertaining to CATV (cable television) broadcasts and a DBS section for processing key generation data pertaining to DBS (direct broadcast satellite) broadcasts. These sections are embodied in a first control computer. The first control computer generates a CATV program rekey message 78 (shown within dashed lines in FIG. 5A), a DBS program rekey message 79 (shown within dashed lines in FIG. 5B), a first category sequence number 80, a second category sequence number 81, a unit key index 82, a CATV category key 83a, a DBS category key 83b, a program prekey prekey 84 and program cost data 85. The DBS category key 83b is different from the CATV category key 83a.

The CATV and DBS categories are distinguished functionally by the fact that they have different access requirement definitions. In order that the same program key is reproduced for both categories, the output of the CATV section is used as the initial prekey for the DBS section. All CATV descramblers, therefore, must process both the CATV and DBS information in order to derive the program key. However, only the CATV authorization data is processed by an authorization processor 35 to authorize a CATV descrambler. The concatenation of CATV and DBS program key production and reproduction chains is shown in the combination of FIGS. 5(A) and 5(b) and in the combination of FIGS 7(A) and 7(B). Additional categories could precede the CATV category in the chain if, for example, additional data services were to be provided to specialized data descramblers as well as to CATV and DBS descramblers. If the chain includes more than two stages, the key generation data for the additional stages includes a category number that is used as an address to select the program rekey message.

The output of this chain may be further modified if an impulse-purchasable program has a free preview portion. In this case, one bit of the output of the program key generation data chain is complemented during the free preview portion of the program.

The CATV section includes first and second data registers, 86, 87, first and second encryption units 88, 89, first and second XOR gates 90, 91, an expansion unit 92, and a truncation unit 93.

Program prekey generation data, is stored in the second register 87. This includes either a control byte, data service tiers bytes 0, 1 and 2, and four subscription tiers, as shown in FIG. 5A, or the control byte and seven tier bytes 0-6, as determined by the control byte. Each register section shown in the drawing contains one byte of data. The tier data indicates particular programming that may be descrambled on a subscription basis by CATV subscribers and on either a subscription or an impulse-pay-per-view (IPPV) basis by DBS subscribers.

The expansion unit 92 combines the program prekey prekey 84, which is seven bytes long, with the first category sequence number 80, which is one byte long, to produce an expanded eight-byte program prekey prekey 95. The first XOR gate 90 processes the expanded program prekey prekey 95 with spotbeam mask data stored in the first register 86 by modulo-2 addition to produce a preencrypted program prekey prekey 96. The first encryption unit 88 encrypts the preencrypted program prekey prekey 96 with the CATV category key 83a in accordance with a first encryption algorithm, such as the DES algorithm, to produce an encrypted program prekey prekey 97. Spotbeam mask data indicates geographical regions where descrambling of the broadcast television signal is authorized. The encrypted program prekey prekey 97 in included in the CATV program rekey message 78.

The second encryption unit 89 encrypts the program prekey generation data stored in the second register 87 with the program prekey prekey 84 in accordance with a second encryption algorithm to produce encrypted program key generation data 99. The truncation unit 93 reduces the length of the encrypted program generation data 99 by truncating the least significant data byte to produce truncated encrypted program key generation data 100, which is seven bytes long. The truncation unit 93 is required only if the encryption algorithm produces an 8-byte output signal upon being keyed with a 7-byte key. The second XOR gate 91 processes the seven-byte truncated encrypted program key generation data 100 with the seven bytes of program prekey generation data stored in the second register 87 other than the control byte by modulo-2 addition to produce a program prekey 101, which is forwarded to the DBS section (FIG. 5B). The first and second algorithms may be the same or different.

The DBS section includes first, second and third data registers 103, 104, 105, first, second and third encryption units 106, 107, 108, first, second and third XOR gates 109, 110, 111, an expansion unit 112, and first and second truncation units 113, 114.

Spotbeam mask data is stored in the first register 103.

Intermediate program key generation data is stored in the second register 104. This includes either a control byte, data service tiers bytes 0, 1 and 2, and four subscription tiers, as shown in FIG. 5A, or the control byte and seven tier bytes 0-6.

Program key generation data is stored in the third register 105. This includes the first category sequence number (one byte) 80, the second category sequence number (one byte) 81, the unit key index (one byte) 82, and two bytes of program cost data 85.

The expansion unit 112 combines the program prekey 101, which is seven bytes long, with the first category sequence number 80, which is one byte long, to produce an expanded eight-byte program prekey 116. The first XOR gate 109 processes the expanded program prekey 116 with spotbeam mask data stored in the first register 103 by modulo-2 addition to produce a preencrypted program prekey 117. The first encryption unit 106 encrypts the preencrypted program prekey 117 with the DBS category key 83b in accordance with a first encryption algorithm, such as the DES algorithm, to produce an encrypted program prekey 118. The encrypted program prekey 118 is included in the DBS program rekey message 79.

The second encryption unit 107 encrypts the first program key generation data stored in the second register 104 with the program prekey 101 in accordance with a second encryption algorithm to produce encrypted first program key generation data 120. The first truncation unit 113 reduces the length of the encrypted first program generation data 120 by truncating the least significant data byte to produce truncated encrypted first program key generation data 121, which is seven bytes long. The second XOR gate 110 processes the seven-byte truncated encrypted first program key generation data 121 with the seven bytes of program key generation data stored in the second register 104 other than the control byte by modulo-2 addition to produce an intermediate program key 122. The intermediate program key 122 may be encrypted by another category key and distributed to descramblers as an encrypted program key in accordance with a modified version of the prior art system described in U.S. Pat. No. 4,712,238. In the modified version of such prior art system, the descrambler thereof is modified by adding a stage that processes the program key reproduced therein in the same manner as the last stage of the descrambler shown in FIG. 7B herein processes the intermediate program key 122.

The third encryption unit 108 encrypts the second program key generation data stored in the second register 105 with the intermediate program key 122 in accordance with a third encryption algorithm to produce encrypted second program key generation data 124. The first, second and third algorithms may be the same or different. The second truncation unit 114 reduces the length of the encrypted second program key generation data 124 by truncating the least significant data byte to produce truncated encrypted second program key generation data 125, which is seven bytes long. The third XOR gate 111 processes the seven-byte truncated encrypted second program key generation data 125 with the seven bytes of program key generation data stored in the second register 104 other than one of the permanent zero bytes by modulo-2 addition to produce a program key 126. The program key 126 is processed by the keystream generator 13 (FIG. 1A) to produce a keystream 25 for scrambling a television signal. In some embodiments, only the audio portion of the television signal is scrambled by combination with the keystream 25. The program key 126 may be encrypted by another category key and distributed to descramblers as an encrypted program key in accordance with the prior art system described in U.S. Pat. No. 4,712,238.

The different encryption units may be implemented by a single encryption unit on a time shared basis. Other processing units likewise may be implemented in single processing units on a time shared basis.

A portion of the key generation data is also processed in a second control computer at a signal distribution site to encrypt the category key 83 for distribution. Such processing is described with reference to FIG. 6.

The category key 83 also is used to authenticate certain unit-specific authorization data such as the descrambler unit's access tiers and impulse pay-per-view (IPPV) credit limit, by using repeated applications of the procedure described in U.S. Pat. No. 4,712,238.

In addition, the category key is used to authenticate the second category sequence number 81, which is used as a timelock on program key generation, and the category number, which identifies the descrambler's entry point in the program key generation chain.

For consumer descramblers supporting IPPV, the category key 83 is combined with the descrambler unit address and certain other data to create a unit-specific key which decrypts IPPV-related data items to create a secure authenticator, using the procedure described in U.S. Pat. No. 4,712,238.

Figure 6:
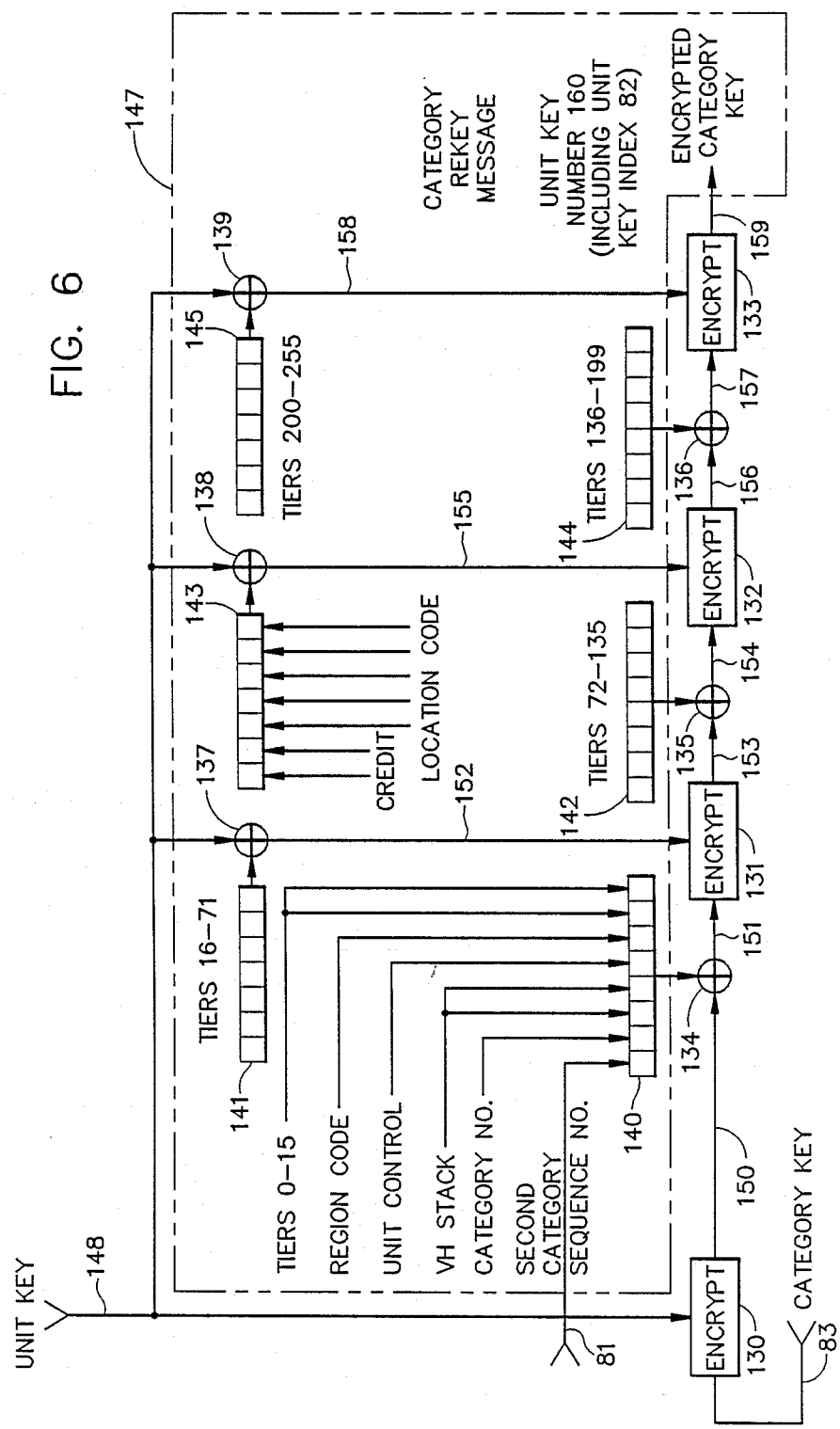
FIG. 6 is a block diagram of a further portion of the key security system of FIG. 5 in which a portion of the key generation data is processed to provide the key that is used to encrypt the prekey.

The processing system of FIG. 6 is included in the second control computer. This processing system includes first, second, third and fourth encryption units 130, 131, 132, 133, first, second, third, fourth, fifth and sixth XOR gates 134, 135, 136, 137, 138, 139 and first, second, third, fourth, fifth and sixth registers 140, 141, 142, 143, 144, 145. Each of the registers stores eight bytes of data.

The second control computer generates a category rekey message including the information shown within the dashed lines 147, and a unit key 148 for each descrambler to which the category rekey message is addressed. The category key 83 and the second category sequence number 81 are received from the first control computer (FIG. 5). The category rekey message 147 is individually addressed to each descrambler. Lists of different unit keys 148 for the different descramblers, as based on a common unit key number 160, are provided to the second control computer. Different category rekey messages are provided for CATV and DBS subscribers.

The first register 140 stores the second category sequence number 81, a category number (one byte), a two byte view history (VH) stack, one byte of unit control data, one byte of region code data, and two tier data bytes for tiers 0–15.

The second register 141 stores seven tier data bytes for tiers 16–71.

The third register 142 stores eight tier data bytes for tiers 72–135.

The fourth register 143 stores two bytes of credit data pertaining to the descrambler to which the category rekey message 147 is addressed and five bytes of location code.

The fifth register 144 stores eight tier data bytes for tiers 136–199.

The sixth register 145 stores seven tier data bytes for tiers 200–255.

The first encryption unit 130 encrypts the category key 83 with the unit key 148 in accordance with a first encryption algorithm, such as the DES algorithm, to produce a first intermediate encrypted category key 150.

The first XOR gate 134 processes the first intermediate encrypted category key 150 with the data stored in the first register 140 by modulo-2 addition to produce a second intermediate encrypted category key 151.

The fourth XOR gate 137 processes the unit key 148 with the data stored in the second register 141 by modulo-2 addition to produce a first encrypted unit key 152.

The second encryption unit 131 encrypts the second intermediate encrypted category key 151 with the first encrypted unit key 152 in accordance with a second encryption algorithm to produce a third intermediate encrypted category key 153.

The second XOR gate 135 processes the third intermediate encrypted category key 153 with the data stored in the third register 142 by modulo-2 addition to produce a fourth intermediate encrypted category key 154.

The fifth XOR gate 138 processes the unit key 148 with the data stored in the fourth register 143 by modulo-2 addition to produce a second encrypted unit key 155.

The third encryption unit 133 encrypts the fourth intermediate encrypted category key 154 with the second encrypted unit key 155 in accordance with a third encryption algorithm to produce a fifth intermediate encrypted category key 156.

The third XOR gate 136 processes the fifth intermediate encrypted category key 156 with the data stored in the fifth register 144 by modulo-2 addition to produce a sixth intermediate encrypted category key 157.

The sixth XOR gate 139 processes the unit key 148 with the data stored in the sixth register 145 by modulo-2 addition to produce a third encrypted unit key 158.

The fourth encryption unit 133 encrypts the sixth intermediate encrypted category key 157 with the third encrypted unit key 158 in accordance with a fourth encryption algorithm to produce an encrypted category key 159. The encrypted category key 159 is included in each category rekey message 147. Each category rekey message 147 also includes a three-byte unit key number 160. The unit key number 160 includes the one-byte unit key index 82, which is common to all descramblers for a given program.

The first, second, third and fourth encryption algorithms may be the same or different. The first, second, third and fourth encryption units may be embodied in a single encryption unit on a time-shared bases.

The scrambled television program, the category rekey messages 147 and each program rekey message 78, 79 are distributed to the descramblers of the respective CATV and DBS broadcast systems.

Figure 7A:
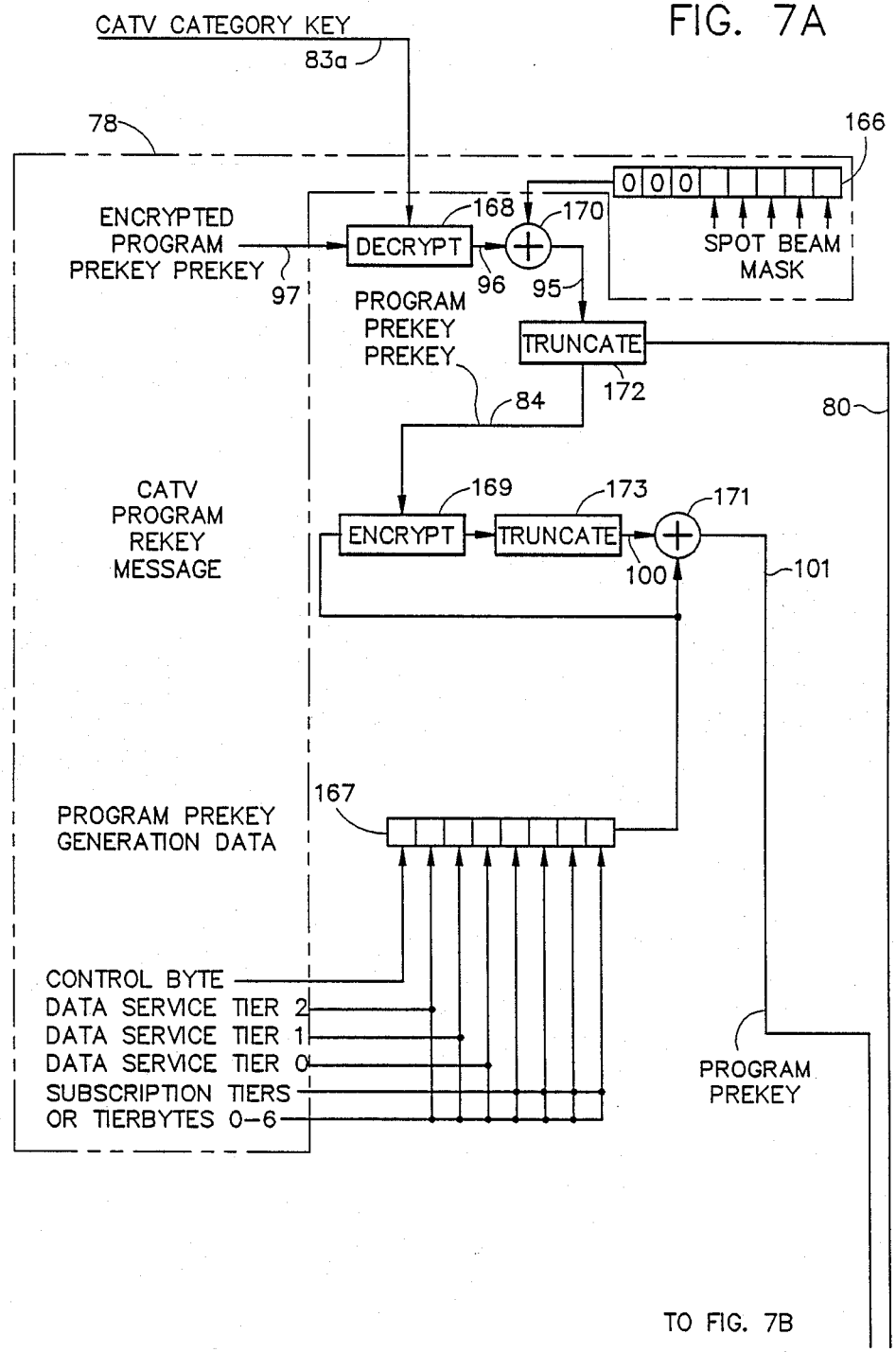
FIG. 7, which is a combination of FIGS. 7A and 7B, is a block diagram of a preferred embodiment of a portion of a descrambler according to the present invention that processes the distributed key generation data and encrypted prekey to provide the key used for descrambling the distributed scrambled information signal.
Figure 8:
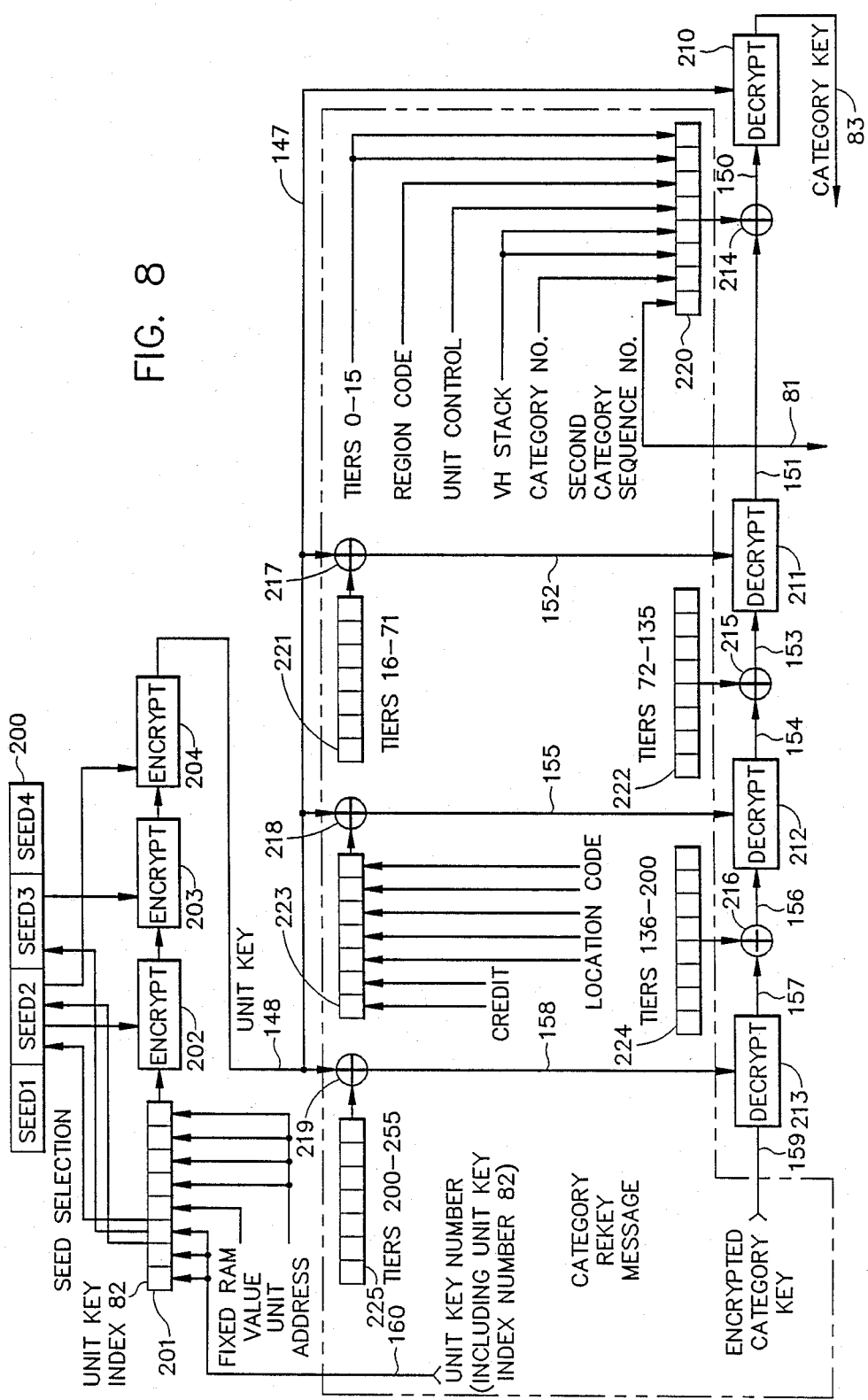
FIG. 8 is a block diagram of a further portion of the descrambler of FIG. 7 in which a portion of the key generation data is processed to provide the key that is used to decrypt the encrypted prekey.

FIGS. 7 and 8 illustrate a descrambler, which is included in a preferred embodiment of the security system of the present invention for descrambling television signals having their program keys secured by that portion of the security system described with reference to FIGS. 5 and 6.

Referring to FIG. 7, a descrambler included in a CATV system, makes use of a CATV section (FIG. 7A) for processing key generation data pertaining to CATV broadcasts and a DBS section (FIG. 7B) for processing key generation data pertaining to DBS broadcasts; whereas a descrambler included in a DBS system makes use of only the DBS section (FIG. 7B). The descrambler is adapted to process both the CATV rekey message 78 and the DBS program rekey message 79. The descrambler includes first and second switches 161, 162, which are placed in the DBS position when the descrambler is included in a DBS broadcast system, or placed in the CATV position when the descrambler is included in a CATV broadcast system. The positioning of the first and second switches 161, 161 is determined in accordance with a category number that is used as an address to select the CATV or DBS program rekey message.

The CATV section of the descrambler includes first and second data registers, 166, 167, a decryption unit 168, an encryption unit 169, first and second XOR gates 170, 171, and first and second truncation units 172, 173.

Program prekey generation data, is stored in the second register 167. This includes either a control byte, data service tiers bytes 0, 1 and 2, and four subscription tiers, as shown in FIG. 7A, or the control byte and seven tier bytes 0–6.

The decryption unit 168 decrypts the encrypted prekey prekey 97 with the CATV category key 83a in accordance with the first algorithm used by the encryption unit 88 in the first control computer (FIG. 5A) to provide reproduce the preencrypted program prekey prekey 96.

The first XOR gate 170 processes the reproduced preencrypted program prekey prekey 96 with spotbeam mask data stored in the first register 166 by modulo-2 addition to reproduce the expanded program prekey prekey 95. Since the reproduced expanded program prekey prekey 95 is eight bytes long, the first truncation unit 172 truncates one byte therefrom to reproduce the program prekey prekey 84. The truncated byte is the first category sequence number 80, which is provided via the switch 162 to the DBS section for use as part of the second key generation data for reproducing the second program key, as will be described below in relation to the reproduction of the second program key.

The encryption unit 169 encrypts the program prekey generation data stored in the second register 167 with the reproduced program prekey prekey 84 in accordance with the second encryption algorithm used by the second encryption unit 89 in the first control computer to reproduce the encrypted program key generation data 99. The truncation unit 173 reduces the length of the reproduced encrypted program generation data 99 by truncating the least significant byte to reproduce the truncated encrypted program key generation data 100, which is seven bytes long. The second XOR gate 171 processes the reproduced seven-byte truncated encrypted program prekey generation data 100 with the seven bytes of program key generation data stored in the second register 87 other than the control byte by modulo-2 addition to reproduce the program prekey 101, which is forwarded to the DBS section (FIG. 7B).

The DBS section includes first, second and third data registers 183, 184, 185, a decryption unit 186, first and second encryption units 187, 188, first, second and third XOR gates 189, 190, 191, and first, second and third truncation units 192, 193, 194.

Spotbeam mask data is stored in the first register 183.

Intermediate program key generation data is stored in the second register 184. This includes either a control byte, data service tiers bytes 0, 1 and 2, and four subscription tiers, as shown in FIG. 7A, or the control byte and seven tier bytes 0–6.

Program key generation data is stored in the third register 185. This includes the first category sequence number (one byte) 80, the second category sequence number (one byte) 81, the unit key index (one byte) 82, and two bytes of program cost data 85. The second category sequence number 81 and the unit key index 82 are provided from the received category rekey message 147 to provide a timelock for reproduction of the program key.

The decryption unit 186 decrypts the encrypted prekey 118 with the DBS category key 83b in accordance with the first algorithm used by the encryption unit 106 in the first control computer (FIG. 5B) to provide reproduce the preencrypted program prekey 117.

The first XOR gate 189 processes the reproduced preencrypted program prekey 117 with spotbeam mask data stored in the first register 183 by modulo-2 addition to reproduce the expanded program prekey 116. Since the reproduced expanded program prekey 116 is eight bytes long, the first truncation unit 192 truncates one byte therefrom to reproduce the program prekey 101. The truncated byte is the first category sequence number 80, which is provided via the switch 162 to the register 185 for use as part of the second key generation data for reproducing the second program key, as will be described below.

The first encryption unit 187 encrypts the first program generation data stored in the second register 184 with the reproduced program prekey 101 in accordance with the second encryption algorithm used by the second encryption unit 107 in the first control computer to reproduce the encrypted first program key generation data 120. The truncation unit 193 reduces the length of the reproduced encrypted first program generation data 120 by truncating the least significant byte to reproduce the truncated encrypted first program key generation data 121, which is seven bytes long. The second XOR gate 190 processes the reproduced seven-byte truncated encrypted first program prekey generation data 121 with the seven bytes of program key generation data stored in the second register 184 other than the control byte by modulo-2 addition to reproduce the intermediate program key 122.

The second decryption unit 188 decrypts the encrypted prekey 118 with the category key 83 in accordance with the first algorithm used by the encryption unit 106 in the first control computer (FIG.5B) to provide reproduce the preencrypted program prekey 117.

The first XOR gate 189 processes the reproduced preencrypted program prekey 117 with spotbeam mask data stored in the first register 183 by modulo-2 addition to reproduce the expanded program prekey 116. Since the reproduced expanded program prekey 116 is eight bytes long, the first truncation unit 192 truncates one byte therefrom to reproduce the program prekey 101. The truncated byte is the first category sequence number 80, which is provided via the switch 162 to the register 185 for use as part of the second key generation data for reproducing the second program key, as will be described below.

The first encryption unit 187 encrypts the first program generation data stored in the second register 184 with the reproduced program prekey 101 in accordance with the second encryption algorithm used by the second encryption unit 107 in the first control computer to reproduce the encrypted first program key generation data 120. The truncation unit 193 reduces the length of the reproduced encrypted first program generation data 120 by truncating the least significant byte to reproduce the truncated encrypted first program key generation data 121, which is seven bytes long. The second XOR gate 190 processes the reproduced seven-byte truncated encrypted first program prekey generation data 121 with the seven bytes of program key generation data stored in the second register 184 other than the control byte by modulo-2 addition to reproduce the intermediate program key 122.

The second encryption unit 188 encrypts the second program key generation data stored in the third register 185 with the intermediate program key 122 in accordance with the third encryption algorithm used by the third encryption unit in the first control computer (FIG. 5B) to reproduce the encrypted second program key generation data 124. The third truncation unit 194 reduces the length of the reproduced encrypted second program generation data 124 by truncating the least significant data byte to reproduce the truncated encrypted second program key generation data 125, which is seven bytes long. The third XOR gate 191 processes the reproduced seven-byte truncated encrypted second program key generation data 125 with the seven bytes of program key generation data stored in the second register 185 other than one of the permanent zero bytes by modulo-2 addition to reproduce the program key 126. The program key 126 is processed by the keystream generator 33 (FIG. 1B) to reproduce the keystream 25 for descrambling the scrambled television signal.

The section of the descrambler that processes the category rekey message to reproduce the category key 83 is described with reference to FIG. 8.

This processing section includes a key seed memory 200, a unit key generation data register 201, first, second and third encryption units 202, 203, 204, first, second, third and fourth decryption units 210, 211, 212, 213, first, second, third, fourth, fifth and sixth XOR gates 214, 215, 216, 217, 218, 219 and first, second, third, fourth, fifth and sixth registers 220, 221, 222, 223, 224, 225. Each of the registers stores eight bytes of data. The different encryption units may be implemented by a single encryption unit on a time shared basis. Other processing units likewise may be implemented in single processing units on a time shared basis.

The first register 220 stores the second category sequence number 81, which is also provided to the portion of the descrambler discussed in FIG. 7, a category number (one byte), a two byte view history (VH) stack, one byte of unit control data, one byte of region code data, and two tier data bytes for tiers 0-15.

The second register 221 stores seven tier data bytes for tiers 16-71.

The third register 222 stores eight tier data bytes for tiers 72-135.

The fourth register 223 stores two bytes of credit data pertaining to the descrambler to which the category rekey message 147 is addressed and five bytes of location code.

The fifth register 224 stores eight tier data bytes for tiers 136-199.

The sixth register 225 stores seven tier data bytes for tiers 200-255.

The tier data, program cost data, and credit data are processed by the authorization processor 35 to determine whether the descrambler is to be enabled for descrambling the scrambled television signal, as described in the aforementioned U.S. Pat. No. 4,712,238.

The sixth XOR gate 219 processes the reproduced unit key 148 with the data stored in the sixth register 225 by modulo-2 addition to reproduce the third encrypted unit key 158.

The fourth decryption unit 213 decrypts the encrypted category key 159 with the reproduced third encrypted unit key 158 is accordance with the fourth encryption algorithm used by the fourth encryption unit 143 in the second control computer (FIG. 6) to reproduce the sixth intermediate encrypted category key 157.

The third XOR gate 216 processes the reproduced sixth intermediate encrypted category key 157 with the data stored in the fifth register 224 by modulo-2 addition to reproduce the fifth intermediate encrypted category key 156.

The fifth XOR gate 218 processes the reproduced unit key 148 with the data stored in the fourth register 223 by modulo-2 addition to reproduce the second encrypted unit key 155.

The third decryption unit 212 decrypts the reproduced fifth intermediate encrypted category key 156 with the reproduced second encrypted unit key 155 in accordance with the third encryption algorithm used by the third encryption unit 132 in the second control computer to reproduce the fourth intermediate encrypted category key 154.

The second XOR gate 215 processes the reproduced fourth intermediate encrypted category key 154 with the data stored in the third register 222 to reproduce the third intermediate encrypted category key 153.

The fourth XOR gate 217 processes the reproduced unit key 148 with the data stored in the second register 223 by modulo-2 addition to reproduce the first encrypted unit key 155.

The second decryption unit 211 decrypts the reproduced third intermediate encrypted category key 153 with the reproduced first encrypted unit key 152 in accordance with the second encryption algorithm used by the second encryption unit 131 in the second control computer to reproduce the second intermediate encrypted category key 151.

The first XOR gate 214 processes the reproduced second intermediate encrypted category key 151 with the data stored in the first register 220 to reproduce the first intermediate encrypted category key 150.

The first decryption unit 210 decrypts the reproduced first intermediate encrypted category key 150 with the reproduced unit key 148 in accordance with the first encryption algorithm used by the first encryption unit 130 in the first control computer to reproduce the category key 83.

The unit key generation data register 201 stores a three byte unit key number 160, which is included in the category rekey message 147, a one-byte fixed RAM value, which is stored in an internal RAM, and an eight byte unit address. The key generation number includes the unit key index 82, which is also included in the second program key generation data stored in the register 185 and processed to reproduce the program key 126.

The first, second and third encryption units 202, 203, 204 encrypt the unit key generation data stored in the register 201 by using key seeds selected from the seed memory 200 in accordance with the contents of the unit key number 160 to reproduce the unit key 148 used to produce the encrypted category key 159 included in the category rekey message 147 addressed to the descrambler. Such reproduction of the unit key is in accordance with the teaching of U.S. Pat. No. 4,634,808 to Karl E. Moerder. One byte of the unit key number 160, the unit key index 82, is used as a timelock to couple unit keys with program keys as described with reference to FIGS. 5B and 7B.

The second category sequence number 81 and the unit key index 82 complete the timelocks linking the program key 126 to the category key 83 and unit keys 148.

The first category sequence number 80 and the unit key index 82 complete the timelocks linking the program key 126 to the category key and the unit keys of the modified version of the prior art system described in U.S. Pat. No. 4,712,238.

In an alternative preferred embodiment, the invention is applied to the security concepts of shared addressing described in International Pat. Application No. PCT/GB84/00237, filed 2 July 1983. In such an alternative embodiment the unit key, generated as described above or by other means, is used to authenticate unit-specific data as described above, and to deliver a shared-address key, known to a small number of units which possess the same shared address. One byte of the shared address, the shared address index, may optionally be authenticated and used for timelock purposes. Category keys and the associated category number and sequence number are then delivered to all descramblers having a shared address with a single message, encrypted under the shared address key. The category sequence number must be authenticated using the shared address key so that it may be used for timelock purposes. The category key is used as before, but the final state of program key generation may also be extended to include the shared address index.

We claim:
1. A system, comprising
means for encrypting first-key generation data with a first-key prekey in accordance with a first encryption algorithm to produce a first key;
means for processing the first key to produce a keystream;
means for processing an information signal with the keystream to produce a scrambled information signal;
means for encrypting the first-key prekey with a second key in accordance with a second encryption algorithm to produce an encrypted first-key prekey;
means for distributing the scrambled information signal, the first-key generation data and the encrypted first-key prekey; and
a descrambler, including
means for providing the second key;
means for decrypting the distributed encrypted first-key prekey with the second key in accordance with the second encryption algorithm to reproduce the first-key prekey;
means for encrypting the distributed first-key generation data with the reproduced first-key prekey in accordance with the first encryption algorithm to reproduce the first key;
means for processing the reproduced first key to reproduce the keystream; and
means for processing the distributed scrambled information signal with the reproduced keystream to descramble the distributed scrambled information signal.

2. A system according to claim 1, wherein the means for producing the first key comprise
means for encrypting the first-key generation data with the first-key prekey in accordance with the first encryption algorithm to produce encrypted first-key generation data; and
means for processing the first-key generation data with the encrypted first-key generation data to produce the first key; and wherein the means for reproducing the first key comprise
means for encrypting the distributed first-key generation data with the reproduced first-key prekey in accordance with the first encryption algorithm to reproduce the encrypted first-key generation data; and
means for processing the distributed first-key generation data with the reproduced encrypted first-key generation data to reproduce the first key.

3. A system according to claim 2, wherein the respective means for producing and reproducing the first key each comprises
means for truncating the encrypted first-key generation data; and
means for exclusive-ORing the truncated encrypted first-key generation data with the first-key generation data to produce the first key.

4. A system according to claim 1,
wherein the first-key generation data includes a sequence number associated with the second key; and
wherein the means in the descrambler for providing the second key include means for processing the distributed sequence number to provide the second key.

5. A system according to claim 4,
wherein the first-key generation data further includes a key index used for accessing data processed to provide the second key in the descrambler; and
wherein the means in the descrambler for providing the second key further include means for processing the distributed key index to provide the second key.

6. A system according to claim 1,
wherein the first-key generation data includes a key index used for accessing data processed to provide the second key in the descrambler; and
wherein the means in the descrambler for providing the second key include means for processing the distributed key index to provide the second key.

7. A system according to claim 1,
wherein the first-key generation data includes a quantity of data that must be processed by an authorization processor in the descrambler in order to enable the descrambler, and wherein said quantity of data exceeds the encryption capacity of a single operation of said first encryption algorithm;
wherein the means for producing the first key comprise
means for encrypting a first block of the first-key generation data with the first-key prekey in accordance with the first encryption algorithm to produce an intermediate key; and
means for encrypting a second block of the first-key generation data with the intermediate key in accordance with a third encryption algorithm to produce the first key;
wherein the means in the descrambler for reproducing the first key comprise
means for encrypting said first block of the distributed first-key generation data with the reproduced first-key prekey in accordance with the first encryption algorithm to reproduce the intermediate key; and
means for encrypting said second block of the distributed first-key generation data with the reproduced intermediate key in accordance with a third encryption algorithm to reproduce the first key;
wherein the descrambler further includes an authorization processor for processing the distributed first-key generation data in order to enable the descrambler.

8. A system according to claim 1,
wherein the first-key generation data includes a quantity of data that must be processed by an authorization processor in the descrambler in order to enable the descrambler, and wherein said quantity of data exceeds the encryption capacity of a single operation of said first encryption algorithm;
wherein the means for producing the first key comprise
means for encrypting a first block of the first-key generation data with the first-key prekey in accordance with the first encryption algorithm to produce a first intermediate key;
means for encrypting the first intermediate key with a second block of the first-key generation data in accordance with a third encryption algorithm to produce a second intermediate key;
means for encrypting the second intermediate key with a third block of the first-key generation data in accordance with a fourth encryption algorithm to produce the first key;
wherein the means in the descrambler for reproducing the first key comprise
means for encrypting the first block of the distributed first-key generation data with the reproduced first-key prekey in accordance with the first encryption algorithm to reproduce the first intermediate key;
means for encrypting the reproduced first intermediate key with the second block of the distributed first-key generation data in accordance with the third encryption algorithm to reproduce the second intermediate key;
means for encrypting the reproduced second intermediate key with the third block of the distributed first-key generation data in accordance with the fourth encryption algorithm to reproduce the first key.
wherein the descrambler further includes an authorization processor for processing the distributed first-key generation data in order to enable the descrambler.

9. A system according to claim 1,
wherein the first-key generation data includes a quantity of data that must be processed by an authorization processor in the descrambler in order to enable the descrambler, and wherein said quantity of data exceeds the encryption capacity of a single operation of said first encryption algorithm;
wherein the means for producing the first key comprise
means for encrypting a first block of the first-key generation data with the first-key prekey in accordance with the first encryption algorithm to produce a first intermediate key;
means for processing a second block of the first-key generation data with the first intermediate key to produce a preencrypted second block of data;
means for encrypting the preencrypted second block of data with a third block of the first-key generation data in accordance with a third encryption algorithm to produce an encrypted second block of data;
means for processing the encrypted second block of data with the second block of data to produce a second intermediate key;
means for processing a fourth block of the first-key generation data with the second intermediate key to produce a preencrypted fourth block of data;
means for encrypting the preencrypted fourth block of data with a fifth block of the first-key generation data in accordance with a fourth encryption algorithm to produce an encrypted fourth block of data; and
means for processing the encrypted fourth block of data with the fourth block of data to produce the first key;
wherein the means in the descrambler for reproducing the first key comprise
means for encrypting the first block of the distributed first-key generation data with the reproduced first-key prekey in accordance with the first encryption algorithm to reproduce the first intermediate key;
means for processing the second block of the distributed first-key generation data with the reproduced first intermediate key to reproduce the preencrypted second block of data;
means for encrypting the reproduced preencrypted second block of data with the third block of the distributed first-key generation data in accordance with the third encryption algorithm to reproduce the encrypted second block of data;
means for processing the reproduced encrypted second block of data with the second block of data to reproduce a second intermediate key;
means for processing the fourth block of the distributed first-key generation data with the reproduced second intermediate key to reproduce the preencrypted fourth block of data;

means for encrypting the reproduced preencrypted fourth block of data with the fifth block of the distributed first-key generation data in accordance with the fourth encryption algorithm to reproduce the encrypted fourth block of data; and means for processing the reproduced encrypted fourth block of data with the fourth block of data to reproduce the first key;

wherein the descrambler further includes an authorization processor for processing the distributed first-key generation data in order to enable the descrambler.

10. A system according to claim 1,
wherein the means for processing the first key to produce the keystream, comprise
means for encrypting third-key generation data with the first key in accordance with a third encryption algorithm to produce a third key; and
means for processing the third key to produce the keystream;
wherein the distributing means further distribute the third key generation data; and
wherein the means in the descrambler for processing the reproduced first key to reproduce the keystream, comprise
means for encrypting the distributed third key generation data with the reproduced first key in accordance with the third encryption algorithm to reproduce the third key; and
means for processing the reproduced third key to reproduce the keystream.

11. A system according to claim 1, further comprising
means for encrypting third key generation data with the first key in accordance with a third encryption algorithm to produce a third key;
means for processing the third key to produce the keystream;
wherein the distributing means further distribute the third key generation data; and
a second descrambler, including
means for providing the second key;
means for decrypting the distributed encrypted first-key prekey with the second key in accordance with the second encryption algorithm to reproduce the first-key prekey;
means for encrypting the distributed first-key generation data with the reproduced first-key prekey in accordance with the first encryption algorithm to reproduce the first key;
means for encrypting the distributed third key generation data with the reproduced first key in accordance with the third encryption algorithm to reproduce the third key;
means for processing the reproduced third key to reproduce the keystream; and
means for processing the distributed scrambled information signal with the reproduced keystream to descramble the distributed scrambled information signal.

12. A system according to claim 1, further comprising
means for encrypting the first key generation data with the second key in accordance with a third encryption algorithm to produce an encrypted first key;
wherein the distributing means further distribute the encrypted first key; and
a second descrambler, including means for providing the second key;
means for decrypting the distributed encrypted first key with the second key in accordance with the third encryption algorithm to reproduce the first key;
means for processing the reproduced first key to reproduce the keystream; and
means for processing the distributed scrambled information signal with the reproduced keystream to descramble the distributed scrambled information signal.

13. A system according to claim 1, further comprising
means for encrypting first-key prekey generation data with a first-key prekey prekey in accordance with a third encryption algorithm to produce the first-key prekey;
means for encrypting the first-key prekey prekey with the second key in accordance with a fourth encryption algorithm to produce an encrypted first-key prekey prekey;
wherein the distributing means further distribute the encrypted first-key prekey prekey, the first-key prekey generation data and a descrambler category identification number;
wherein the descrambler further comprises
means for decrypting the distributed encrypted first-key prekey prekey with the second key in accordance with the fourth encryption algorithm to reproduce the first-key prekey prekey;
means for encrypting the distributed first-key prekey generation data with the reproduced first-key prekey prekey in accordance with the third encryption algorithm to reproduce the first-key prekey; and
switching means responsive to the distributed descrambler category identification number for causing the first-key prekey that is used to encrypt the distributed first-key generation data to be reproduced by either (a) decrypting the distributed encrypted first-key prekey with the second key in accordance with the second algorithm or (b) decrypting the distributed encrypted first-key prekey prekey with the second key in accordance with the fourth algorithm to reproduce the first-key prekey prekey and encrypting the distributed first-key prekey generation data with the reproduced first-key prekey prekey in accordance with the third algorithm.

14. A descrambler for descrambling a scrambled information signal produced by a system that encrypts first-key generation data with a first-key prekey in accordance with a first encryption algorithm to produce a first key; processes the first key to produce a keystream; processes the information signal with the keystream to produce a scrambled information signal; encrypts the first-key prekey with a second key in accordance with a second encryption algorithm to produce an encrypted first-key prekey; and distributes the scrambled information signal, the first-key generation data and the encrypted first-key prekey, the descrambler comprising
means for providing the second key;
means for decrypting the distributed encrypted first-key prekey with the second key in accordance with the second encryption algorithm to reproduce the first-key prekey;
means for encrypting the distributed first-key generation data with the reproduced first-key prekey in accordance with the first encryption algorithm to reproduce the first key;

means for processing the reproduced first key to reproduce the keystream; and means for processing the distributed scrambled information signal with the reproduced keystream to descramble the distributed scrambled information signal.

15. A descrambler according to claim 14 for descrambling an information signal scrambled by a said system in which the first key is produced by encrypting the first-key generation data with the first-key prekey in accordance with the first encryption algorithm to produce encrypted first key-generation data; and processing the first key generation data with the encrypted first-key generation data to produce the first key, wherein the means for reproducing the first key comprise means for encrypting the distributed first-key generation data with the reproduced first-key prekey in accordance with the first encryption algorithm to reproduce the encrypted first-key generation data; and means for processing the distributed first-key generation data with the reproduced encrypted first-key generation data to reproduce the first key.

16. A descrambler according to claim 15 for descrambling an information signal scrambled by a said system in which the first key is further produced by truncating the encrypted first-key generation data and exclusive-ORing the truncated first-key generation data with the first key generation data to produce the first key, wherein the means for reproducing the first key comprises means for truncating the encrypted first-key generation data; and means for exclusive-ORing the truncated encrypted first-key generation data with the distributed first-key generations data to reproduce the first key.

17. A descrambler according to claim 14 for descrambling an information signal scrambled by a said system, wherein the first-key generation data includes a quantity of data that must be processed by an authorization processor in the descrambler in order to enable the descrambler, and wherein said quantity of data exceeds the encryption capacity of a single operation of said first encryption algorithm; and in which system the first key is produced by encrypting a first block of the first-key generation data with the first-key prekey in accordance with the first encryption algorithm to produce an intermediate key; and encrypting a second block of the first-key generation data with the intermediate key in accordance with a third encryption algorithm to produce the first key, wherein the means in the descrambler for reproducing the first key comprise means for encrypting said first block of the distributed first-key generation data with the reproduced first-key prekey in accordance with the first encryption algorithm to reproduce the intermediate key; and means for encrypting said second block of the distributed first-key generation data with the reproduced intermediate key in accordance with a third encryption algorithm to reproduce the first key;

wherein the descrambler further includes an authorization processor for processing the distributed first-key generation data in order to enable the descrambler.

18. A descrambler according to claim 14 for descrambling an information signal scrambled by a said system, wherein the first-key generation data includes a quantity of data that must be processed by an authorization processor in the descrambler in order to enable the descrambler, and wherein said quantity of data exceeds the encryption capacity of a single operation of said first encryption algorithm; and in which system the first key is produced by encrypting a first block of the first-key generation data with the first-key prekey in accordance with the first encryption algorithm to produce a first intermediate key; encrypting the first intermediate key with a second block of the first-key generation data in accordance with a third encryption algorithm to produce a second intermediate key; encrypting the second intermediate key with a third block of the first-key generation data in accordance with a fourth encryption algorithm to produce the first key, wherein the means in the descrambler for reproducing the first key comprise means for encrypting the first block of the distributed first-key generation data with the reproduced first-key prekey in accordance with the first encryption algorithm to reproduce the first intermediate key;

means for encrypting the reproduced first intermediate key with the second block of the distributed first-key generation data in accordance with the third encryption algorithm to reproduce the second intermediate key;

means for encrypting the reproduced second intermediate key with the third block of the distributed first-key generation data in accordance with the fourth encryption algorithm to reproduce the first key.

wherein the descrambler further includes an authorization processor for processing the distributed first-key generation in order to enable the descrambler.

19. A descrambler according to claim 14 for descrambling an information signal scrambled by a said system, wherein the first-key generation data includes a quantity of data that must be processed by an authorization processor in the descrambler in order to enable the descrambler, and wherein said quantity of data exceeds the encryption capacity of a single operation of said first encryption algorithm; and in which system the first key is produced by encrypting a first block of the first-key generation data with the first-key prekey in accordance with the first encryption algorithm to produce a first intermediate key; processing a second block of the first-key generation data with the first intermediate key to produce a preencrypted second block of data; encrypting the preencrypted second block of data with a third block of the first-key generation data in accordance with a third encryption algorithm to produce an encrypted second block of data; processing the encrypted second block of data with the second block of data to produce a second intermediate key; processing a fourth block of the first-key generation data with the second intermediate key to produce a preencrypted fourth block of data; encrypting the preencrypted fourth block of data with a fifth block of the first-key generation data in accordance with a fourth encryption algorithm to produce an encrypted fourth block of data; and processing the encrypted fourth block of data with the fourth block of data to produce the first key,
- wherein the means in the descrambler for reproducing the first key comprise
  - means for encrypting the first block of the distributed first-key generation data with the reproduced first-key prekey in accordance with the first encryption algorithm to reproduce the first intermediate key;
  - means for processing the second block of the distributed first-key generation data with the reproduced first intermediate key to reproduce the preencrypted second block of data;
  - means for encrypting the reproduced preencrypted second block of data with the third block of the distributed first-key generation data in accordance with the third encryption algorithm to reproduce the encrypted second block of data;
  - means for processing the reproduced encrypted second block of data with the second block of data to reproduce a second intermediate key;
  - means for processing the fourth block of the distributed first-key generation data with the reproduced second intermediate key to reproduce the preencrypted fourth block of data;
  - means for encrypting the reproduced preencrypted fourth block of data with the fifth block of the distributed first-key generation data in accordance with the fourth encryption algorithm to reproduce the encrypted fourth block of data; and
  - means for processing the reproduced encrypted fourth block of data with the fourth block of data to reproduce the first key;
- wherein the descrambler further includes an authorization processor for processing the distributed first-key generation data in order to enable the descrambler.

20. A descrambler according to claim 14 for descrambling an information signal scrambled by a said system in which the first-key generation data includes a sequence number associated with the second key,
- wherein the means for providing the second key include means for processing the distributed sequence number to provide the second key.

21. A descrambler according to claim 20 for descrambling an information signal scrambled by a said system in which the key generation data further includes a key index used for accessing data processed to provide the second key in the descrambler,
- wherein the means for providing the second key further include means for processing the distributed key index to provide the second key.

22. A descrambler according to claim 14 for descrambling an information signal scrambled by a said system in which the key generation data includes a key index used for accessing data processed to provide the second key in the descrambler,
- wherein the means for providing the second key include means for processing the distributed key index to provide the second key.

23. A descrambler according to claim 14 for descrambling an information signal scrambled by a said system in which the first key is processed to produce the keystream by encrypting third key generation data with the first key in accordance with a third encryption algorithm to produce a third key; and the third key is processed to produce the keystream; and the third key generation data is also distributed,
- wherein the means for processing the reproduced first key to reproduce the keystream, comprise
  - means for encrypting the distributed third key generation data with the reproduced first key in accordance with the third encryption algorithm to reproduce the third key; and
  - means for processing the reproduced third key to reproduce the keystream.

24. A descrambler according to claim 14 for descrambling an information signal scrambled by a said system in which first-key prekey generation data is encrypted with a first-key prekey prekey in accordance with a third encryption algorithm to produce the first-key prekey; the first-key prekey prekey is encrypted with the second key in accordance with a fourth encryption algorithm to produce an encrypted first-key prekey prekey; and the encrypted first-key prekey prekey, the first-key prekey generation data and a descrambler category identification number are also distributed, wherein the descrambler further comprises
- means for decrypting the distributed encrypted first-key prekey prekey with the second key in accordance with the fourth encryption algorithm to reproduce the first-key prekey prekey;
- means for encrypting the distributed first-key prekey generation data with the reproduced first-key prekey prekey in accordance with the third encryption algorithm to reproduce the first-key prekey; and
- switching means responsive to the distributed descrambler category identification number for causing the first-key prekey that is used to encrypt the distributed first-key generation data to be reproduced by either (a) decrypting the distributed encrypted first-key prekey with the second key in accordance with the second algorithm or (b) decrypting the distributed encrypted first-key prekey prekey with the second key in accordance with the fourth algorithm to reproduce the first-key prekey prekey and encrypting the distributed first-key prekey generation data with the reproduced first-key prekey prekey in accordance with the third algorithm.

* * * * *